SANFORD W. HERRINGTON
INVENTOR.

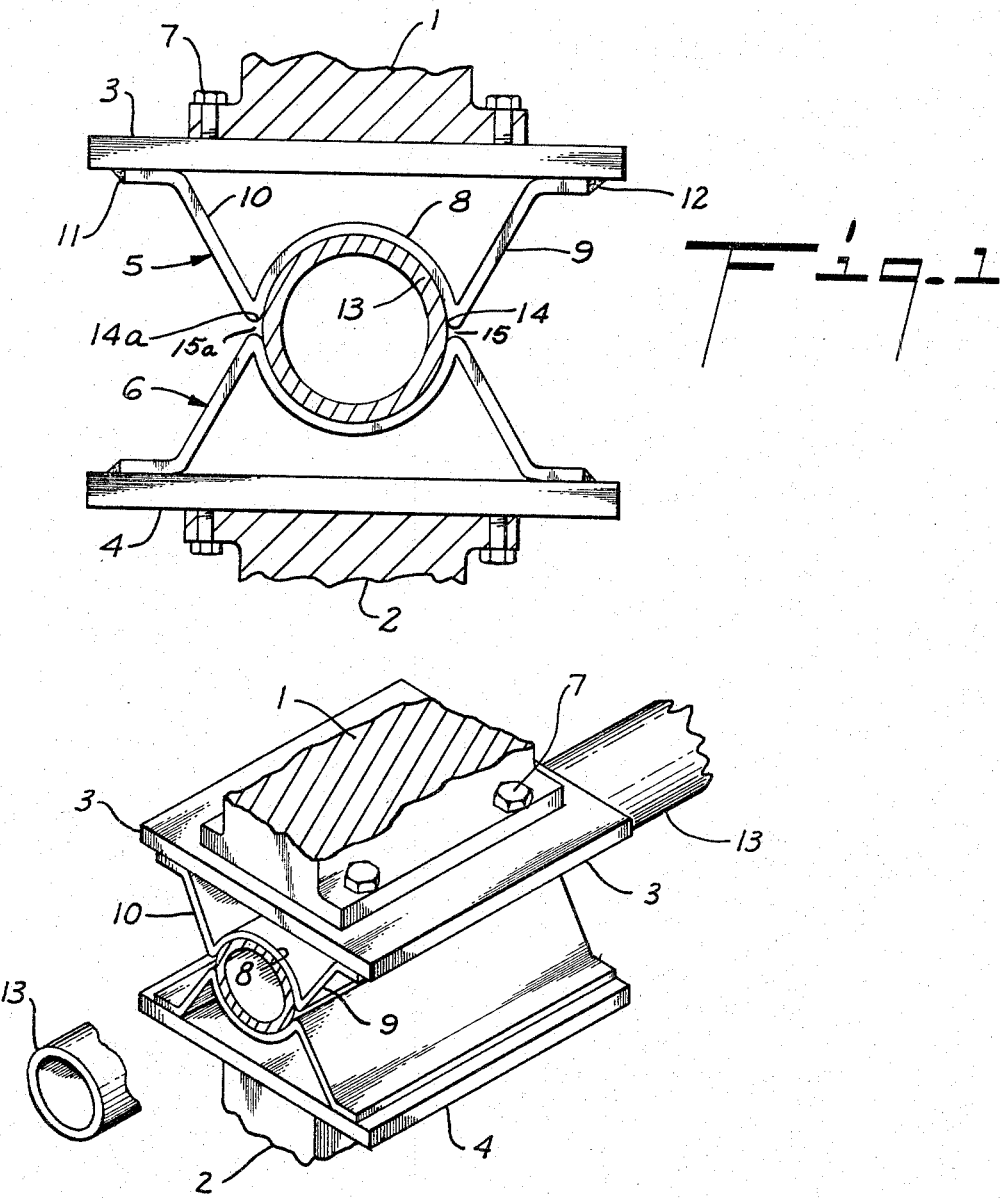

United States Patent Office

3,373,987
Patented Mar. 19, 1968

3,373,987
PIPE VISE
Sanford W. Herrington, 606 Roddy, Clute, Tex. 77531
Filed Feb. 23, 1965, Ser. No. 434,601
6 Claims. (Cl. 269—275)

This invention relates to improvements in vises for holding cylindrical objects such as pipes or rods. It is particularly useful for holding fragile or highly finished piping such as plastic pipe, copper tubing, or chromium plated pipe during threading, cutting or other operations performed prior to installing such pipe in plumbing or other piping systems, but is not limited to such use.

It has been customary to hold pipe of this type for cutting, threading and other operations by wrapping the pipe with a protective material and gripping the wrapped pipe in an ordinary pipe vise. This process is very wasteful of time nonsumed in applying and removing wrappings and has the disadvantage that fragile pipe such as thin walled aluminum pipe, plastic pipe, and the like often is compressed beyond its elastic limit when force sufficient to prevent its turning in the vise is applied, and so may be distorted to out of round shape. Failure of the protective wrapping also may result in marring the finish of highly polished pipe.

Special vises have been suggested to overcome the disadvantages of wrapping the pipe, as for example U.S. Patent No. 2,398,658 which shows a work holding device for gripping cylindrical objects comprising a pair of heavy rigid jaw members pivotally mounted on a base member. Each jaw member is provided with a concave recess for receiving the work piece. The two jaw members are biased to gripping position by a movable member engaging a boss on the end of each jaw member to pivot the jaw members toward each other. This arrangement is highly satisfactory in certain circumstances but has the disadvantage that the jaw is heavy and unyielding so that when too great pressure is exerted to close the jaw upon a fragile pipe, the pipe tends to "bottleneck" or be distorted, and if the concave jaw is to exert even pressure at all points around the circumference of the pipe, both pipe and jaw must be constructed to very accurate dimensions, a condition which is seldom present in practical applications.

It is an object of the present invention to provide an improved pipe vise arrangement capable of holding fragile or highly finished pipe tightly without distorting or marring the pipe under heavy pressure.

Another object is to provide an improved pipe vise in which pipe gripping members bear substantially evenly upon the circumference of a cylindrical object held by the vise.

Another object is to provide an improved pipe vise of the above type in which the vise jaws do not require to be accurately sized to conform to the exterior of a cylindrical object to be held by the vise.

Another object is to provide an improved all metal pipe vise jaw which is resilient and cushions force applied to the pipe.

Another object is to provide an improved pipe jaw of the above type which may be constructed in one piece without separate moving parts.

Other objects and advantages will become apparent to those skilled in the art from consideration of the attached drawings and of the detailed description set forth below.

The vise of the present invention includes a pair of opposed matching jaws movable toward and away from each other. Any type of movement for the jaws may be provided, as for example, pivoted movement of the jaws or any suitable device providing parallel movement of the jaws toward and away from each other. One jaw may be stationary and the other movable as is common practice, since the type of vise body and jaw movement is immaterial to the present invention.

The essence of the present invention lies in the provision of a particular type of vise jaw. This jaw includes a base, a resilient pipe gripping member spaced from the base and having a concave substantially hemi-cylindrical pipe engaging surface. This surface preferably is rather long in proportion to the diameter of the pipe to be held by the vise, for example, a pipe engaging surface about four inches is one preferred length for a pipe of about one inch diameter. The length, however, is not critical, and may vary over wide limits without departing from the spirit of this invention. Convergingly inclined thrust members are carried by the base and are attached to the pipe gripping member adjacent to the longitudinal sides of the pipe engaging surface. These thrust members have sufficient stiffness to flex and contract a pipe gripping member around a cylindrical object to be held by the vise.

It is believed that the invention may be better understood by consideration of the following detailed description and the attached drawings wherein:

FIGURE 1 is a vertical section through the jaws of one preferred type of vise embodying principles of this invention;

FIGURE 2 is a perspective view of the jaws of the same vise with a pipe being shown as held between them;

Figure 3:
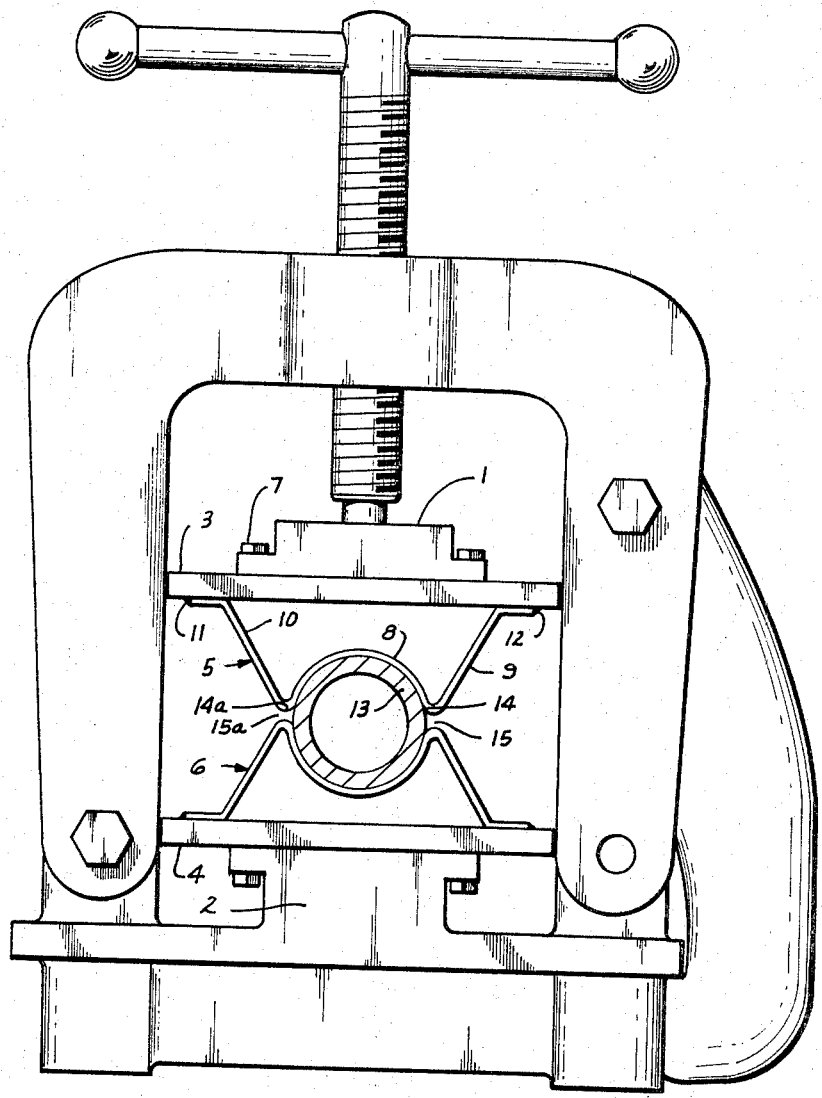
FIGURE 3 is an elevational view of the overall vise, including the jaws of FIGURES 1 and 2, and showing a pipe therebetween, as in FIGURE 2.

The vise includes a pair of jaws 1 and 2 which are movable toward and away from each other by any type of vise jaw movement (not shown). Base plates 3 and 4 are illustrated as detachably connected to jaws 1 and 2 by screws 7, although any other type of detachable connection may be used if desired.

Pipe gripping members 5 and 6 are attached to base plates 3 and 4, and each pipe gripping member includes a flexible but substantially non-stretchable section 8 having a substantially hemi-cylindrical pipe engaging surface and a pair of thrust members 9 and 10 disposed to converge toward each other, carried by a base plate and attached to the corresponding section 8 adjacent to opposite longitudinal sides 14 and 14a of the hemi-cylindrical pipe engaging surface. The thrust members 9 and 10 may be integral with section 8 as illustrated or may be made separate and attached to section 8 in any manner desired. It is preferred that the section 8 and thrust members 9 and 10 be integral, and made from a single plate of spring steel of uniform thickness, and that the thrust members 9 and 10 have wings 6 parallel to and supported by the base plates 3 and 4. The wings 6 are attached to base plates 3 and 4 by welds 11 and 12 or by any other means for attaching that may be desired.

In operation, a cylindrical object illustrated as pipe 13 is placed between the pipe gripping members and the jaws of the vise are closed. Contact of the hemi-cylindrical pipe engaging surfaces and the surface of the cylindrical object results in pressure at diametrically opposite points on opposite sections 8 in a line perpendicular to base plates 3 and 4.

Force is transmitted from sections 8 to the corresponding converging thrust members 9 and 10. Preferably the pair of thrust members attached to a specific section 8 converge at angles in the range from about 45° to 75°, illustrated as 60°, from the plane of the corresponding base. At any rate the angle is sufficient that a considerable component of force tends to move the adjacent edges of opposite sections 8 toward each other and another component of force tends to move these edges toward a plane through the central axis of a cylinder defined by the pipe engaging surfaces of the sections 8 and perpendicular to the base plates 3 and 4. The thrust members have sufficient stiffness to flex the corresponding sections 8 and the ends of the thrust members remote from the base are movable inward either by their own flexibility, as illustrated, or by the provision of suitable pivots or joints (not shown).

As a result of the combined components of force from the thrust members, the sections 8 are flexed to conform accurately to the exterior dimensions of a cylindrical object, such as pipe 13, to be gripped by the vise, and a substantially even pressure is applied to all areas of the pipe in contact with the pipe engaging surfaces of sections 8. As a result of the even distribution of pressure over a large area there is no marring of the finish of highly finished pipe, such as chromium plated pipe, and no bottlenecking, distortion or cracking of soft or fragile pipe such as copper tubing or plastic pipe occurs.

The opposite sections 8 and corresponding thrust members 9 and 10 of the pipe gripping members are so constructed that the opposite longitudinal sides of the sections do not touch and press upon each other as the vise is closed. Clearances 15 and 15a are provided of sufficient width to prevent interference.

A number of vises having matching opposed jaws constructed as described above have been used for holding plastic pipe, aluminum and copper pipe and highly finished pipe. All these vises were found to grip the pipe with sufficient firmness that the pipe could not be turned in the vise by ordinary threading and cutting operations. The finish of the pipe was not marred by the smooth carbon steel of the vise jaws and fragile pipe was not distorted, bottlenecked or broken by a firm grip.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcominations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipe vise, including a pair of vise jaws, a rigid base on each jaw, means for moving the jaws relatively toward and away from one another, a pipe gripping member on each base, each pipe gripping member comprising a flexible, substantially non-stretchable section having a concave pipe engaging surface and thrust members carried by the base and convergingly inclined in a direction away from the base and attached to the section adjacent opposite longitudinal edges of the section so as to locate the concave surface spaced from the base and opposite the concave surface of the other section for receiving a pipe therebetween, the angular inclination of said thrust members with respect to the base being equal, said thrust members having sufficient stiffness to cause said sections to flex and contract around the pipe, as said jaws are moved relatively toward one another, and each of said concave surfaces being substantially a half cylinder, when said sections have been so flexed and contracted, so that there is clearance between the opposite longitudinal edges of said sections.

2. The pipe vise of claim 1, wherein each base is a plate detachably connected to a jaw of the vise.

3. The pipe vise of claim 1, wherein each base has a plane surface facing the flexible section, and the thrust members converge at angles in the range from about 45° to 70° from the plane surface of the base.

4. The pipe vise of claim 3, wherein the trust members have wings which are parallel to the plane surface of the base and attached thereto.

5. The pipe vise of claim 1, wherein each flexible section and the inclined thrust members are integral.

6. The pipe vise of claim 5, wherein each flexible section and inclined thrust members are formed from a single sheet of spring metal of uniform thickness.

References Cited

UNITED STATES PATENTS

| | | | |
|---|---|---|---|
| 1,569,275 | 1/1926 | Green | 269—287 X |
| 2,425,033 | 8/1947 | Fletcher | 248—68 |
| 2,500,711 | 3/1950 | Serra | 269—266 X |
| 2,742,635 | 4/1956 | Capps | 269—287 X |
| 3,227,406 | 1/1966 | Shelton | 248—54 |
| 2,111,468 | 3/1938 | Corkum | 269—2 |

LESTER M. SWINGLE, *Primary Examiner.*

ROBERT C. RIORDON, *Examiner.*

E. SUTTON, *Assistant Examiner.*